(12) United States Patent
Bertolotti et al.

(10) Patent No.: US 11,815,208 B2
(45) Date of Patent: Nov. 14, 2023

(54) FITTING FOR CONNECTING PIPES, IN PARTICULAR FLEXIBLE PIPES

(71) Applicant: I.V.A.R. S.P.A., Prevalle (IT)

(72) Inventors: Umberto Bertolotti, Prevalle (IT); Mario Contini, Flero (IT)

(73) Assignee: I.V.A.R. S.P.A., Prevalle (IT)

( * ) Notice: Subject to any disclaimer, the term of this patent is extended or adjusted under 35 U.S.C. 154(b) by 4 days.

(21) Appl. No.: 17/607,351

(22) PCT Filed: Apr. 22, 2020

(86) PCT No.: PCT/IB2020/053812
§ 371 (c)(1),
(2) Date: Oct. 28, 2021

(87) PCT Pub. No.: WO2020/222088
PCT Pub. Date: Nov. 5, 2020

(65) Prior Publication Data
US 2022/0205569 A1    Jun. 30, 2022

(30) Foreign Application Priority Data
May 2, 2019   (IT) .................. 102019000006496

(51) Int. Cl.
*F16L 33/207*    (2006.01)
(52) U.S. Cl.
CPC ................. *F16L 33/2078* (2013.01)
(58) Field of Classification Search
CPC . F16L 33/2078; F16L 33/207; F16L 33/2071; F16L 33/2073; F16L 33/2076
See application file for complete search history.

(56) References Cited

U.S. PATENT DOCUMENTS 2,258,919 A * 10/1941 Archibald ........... F16L 33/2076
285/276
2,797,111 A *  6/1957 Beazley ............. F16L 33/2078
285/259
(Continued)

FOREIGN PATENT DOCUMENTS

DE    202011107346 U1    9/2012
EP          0332853 A1    9/1989
(Continued)

OTHER PUBLICATIONS

Search Report dated Jul. 24, 2020 in corresponding International Application No. PCT/IB2020/053812, 5 pages.
(Continued)

*Primary Examiner* — David Bochna
(74) *Attorney, Agent, or Firm* — MH2 TECHNOLOGY LAW GROUP LLP (57) ABSTRACT

A fitting (1) for connecting pipes (T) comprises a first tubular element (3), defining at its interior a first duct (3b), and a second tubular element (4), defining at its interior a second duct (4b). The fitting includes a first bushing (11), externally surrounding the first tubular element and creating an annular housing (12). The fitting also includes a first bushing-holder (30), externally associated with the first tubular element and configured for mounting the first bushing, including a seal portion (31) externally wound around a seal sector (40) of the first tubular element. The seal portion is interposed between a portion of a pipe, inserted in the annular housing and the seal sector, and attains a fluid-tight gasket when the first bushing is in a clamping configuration.

15 Claims, 5 Drawing Sheets

(56) References Cited

U.S. PATENT DOCUMENTS

| | | | | |
|---|---|---|---|---|
| 3,549,180 A | * | 12/1970 | MacWilliam | F16L 33/2076 |
| | | | | 285/256 |
| 4,083,584 A | | 4/1978 | Buzzi | |
| 5,608,963 A | * | 3/1997 | Lefere | F16L 33/207 |
| | | | | 138/109 |
| 5,829,795 A | * | 11/1998 | Riesselmann | F16L 33/2078 |
| | | | | 285/259 |
| 2008/0136176 A1 | * | 6/2008 | Katayama | F16L 33/2073 |
| | | | | 285/256 |
| 2012/0298242 A1 | * | 11/2012 | Casella | F16L 33/2073 |
| | | | | 138/103 |
| 2015/0177172 A1 | * | 6/2015 | Upasani | F16L 33/2076 |
| | | | | 324/693 |
| 2019/0331273 A1 | * | 10/2019 | Vos | F16L 37/02 |

FOREIGN PATENT DOCUMENTS

| | | |
|---|---|---|
| EP | 0793047 A1 | 9/1997 |
| EP | 2510272 B1 | 9/2013 |

OTHER PUBLICATIONS

Written Opinion dated Jul. 24, 2020 in corresponding International Application No. PCT/IB2020/053812, 6 pages.

\* cited by examiner

FITTING FOR CONNECTING PIPES, IN PARTICULAR FLEXIBLE PIPES

CROSS-REFERENCE TO RELATED APPLICATIONS

This application is a U.S. National Stage application of PCT/IB2020/053812 filed Apr. 22, 2020, pending, which claims priority to Italian Patent Application No. 102019000006496 filed May 2, 2019, the entire disclosures of which are hereby incorporated by reference in their entireties.

The object of the present invention is a fitting for connecting pipes, and has particular use in the context of the connection of flexible pipes for the circulation of pressurized fluids, e.g. water.

The invention can have advantageous application in the context of thermo-hydraulic plants and/or plants for distributing water in buildings of residential, commercial or industrial type.

As is known, the connection of flexible pipes is generally attained by arranging a fitting having rigid tubular element shape, provided with two or more terminations couplable to the same number of pipes and adapted to place the latter in fluid communication with each other, with fluid seal towards the exterior.

One or more terminations of the fitting, intended to couple a flexible pipe, generally has a shaped anchorage surface on which the flexible pipe is forced to adhere, and on which the flexible pipe is stably grasped following an elastic or permanent deformation. Such anchorage surface can be attained by means of a surface having annular grooves, with which the pipe is forced to be coupled by virtue of its elastic deformability. Such anchorage surfaces are usually made outside the termination, and the termination itself is then inserted within one end of the pipe, being associated stably therewith. The terminations of the fitting can all be provided with an anchorage surface with grooves, for coupling pipes by means of deformation, or they can be made for example by means of a threaded surface, in which the pipe is forced to be engaged by means of screwing; alternatively, the threaded surface of the terminal can be connected to a valve.

In order to ensure a fluid seal between the interior of the tubular element and the exterior of the pipe associated therewith, and thus prevent leaks of fluid towards the exterior, external sheaths (typically termed "bushings") are usually employed, e.g. metal sheaths, which enclose the end of the pipe coupled to the tubular element and are then permanently deformed, for example by imparting a crushing with a gripper, so as to generate a compression on the underlying pipe. In such a manner, the pipe is forced to be crushed against the underlying termination, generating a stable coupling with the same. Such fittings are generally identified as "pressure fittings" (or "press-fit" in technical jargon).

In order to improve the fluid seal between the interior of the fitting/pipe connection and the outside environment, gaskets are generally provided for—e.g. O-ring—to be interposed between each termination of the fitting and the respective pipe coupled thereto.

An example of pressure fittings of known type is constituted by brass fittings, for example of the type described in the patent document EP2677223, on behalf of the same Applicant. Such fittings are typically attained by starting from brass bars, which are molded in order to define the shape of the fitting and the internal duct for the passage of fluid. In addition, on the external surface of the terminations of the fitting, annular grooves or ribs are made (typically by means of mechanical machining) which allow anchoring the flexible pipe to the termination, as illustrated above. In addition, the brass fittings typically have one or more gaskets externally fit on each termination, for example in intermediate positions between the various annular grooves for gripping the pipe. In some cases, the gasket can project radially beyond the bulk of the grooves present on the anchorage surface, in a manner such to be pressed and deformed together with the pipe to be connected following the crushing of the external sheath (or bushing), in a manner such to adhere with greater effectiveness both to the termination of the fitting and to the pipe fit thereto and preventing leaks of fluid between the latter towards the exterior even in conditions of high operation pressures.

The Applicant has encountered that the above-described solutions are not free of drawbacks and they can be improved with regard to several aspects.

First of all, such pressure fittings are complex from a production process standpoint, and this determines a high manufacturing cost.

In addition, the fittings of known type are characterized by a complex and difficult mounting, due to the various components necessary for ensuring both the correct clamping and locking of the flexible pipe to the fitting, and fluid seal once the pressing of the flexible pipe has been executed. For example, an incorrect or unstable positioning of the gasket interposed between the termination of the fitting and the respective pipe can cause a leakage of fluid.

In addition, the performances of the fittings of known type can deteriorate after long installation times or following high operating pressures.

In addition, in the known solutions, the changes of temperature in the transported fluid or the presence of mechanical stresses can lead to a poor functioning or to the onset of failures or malfunctions in the plant.

In this situation, the object at the base of the present invention, in its various aspects and/or embodiments, is to provide a fitting for connecting pipes which is able to overcome of the abovementioned drawbacks.

A further object of the present invention is to propose a fitting for connecting pipes capable of effectively executing the connection of pipes, in particular flexible pipes for circulating pressurized fluids, pipes made of plastic material or "multilayer" pipes (i.e. pipes containing superimposed layers of different materials in which typically one or more of such layers is made of metal material).

A further object of the present invention is to propose a fitting for connecting pipes characterized by a reduced manufacturing cost.

A further object of the present invention is to propose a fitting for connecting pipe of simple and quick manufacturing.

A further object of the present invention is to propose a fitting for connecting pipe characterized by a simplified mounting.

Another object of the present invention is to make a fitting for connecting pipes which has a high operating reliability.

Further object of the present invention is to provide a fitting for connecting pipes characterized by a simple and rational structure.

Further object of the present invention is to create alternative solutions, with respect to the prior art, in making fittings for connecting pipes, and/or opening new design fields.

Such objects, and other possible objects, which will be clearer in the course of the following description, are substantially achieved by a fitting for connecting pipes according to one or more of the enclosed claims, each of which taken separately (with the relative dependent claims) or in any combination with the other claims, as well as the following aspects and/or embodiments, variously combined, also with the aforesaid claims.

Aspects of the invention are listed hereinbelow.

In a first aspect thereof, the invention regards a fitting for connecting pipes, in particular at least one flexible pipe, comprising:
at least one first tubular element provided, at one end thereof, with a first inlet/outlet opening and defining at its interior a first duct;
at least one second tubular element provided, at one end thereof, with a second inlet/outlet opening and defining at its interior a second duct,
said first and second tubular elements being connected to each other, at respective opposite ends to the respective inlet/outlet opening, in a manner such that said first and second ducts are in communication with each other and overall define a joint duct of the fitting placing said first inlet/outlet and said second inlet/outlet opening in fluid communication.

In one aspect the fitting comprises at least one first bushing associable with the first tubular element in a manner such to externally surround it and to create, between the bushing itself and the first tubular element, an annular housing intended to insertingly receive a pipe, such pipe being interposed between the first tubular element and the first bushing, said first bushing having an internal surface, directed towards the first tubular element, and an external surface.

In one aspect at least said first tubular element has an external surface directed towards said first bushing and an internal surface directed towards, and defining, said first duct.

In one aspect said first bushing is configured for operating at least in an insertion configuration, in which it allows the insertion of a pipe in said annular housing, and a clamping configuration, in which it presses and stably locks, in a fluid-tight manner, the pipe in the annular housing.

In one aspect the fitting also comprises at least one first bushing-holder externally associated with the first tubular element and configured for mounting said first bushing on said first tubular element in a manner such that the first bushing is (stably) positioned around the first tubular element, at a specific distance therefrom, and defines said annular housing.

In one aspect said first bushing-holder comprises a seal portion externally wound around and in contact with a seal sector of the first tubular element, said seal portion being configured for being interposed between a portion of the pipe, once inserted in the annular housing, and said seal sector of the first tubular element.

In one aspect said seal portion of the first bushing-holder attains (forms) a fluid-tight gasket at least when said first bushing is in said clamping configuration, preventing the leakage of fluid between the first duct and the exterior of the fitting.

In one aspect, when the first bushing is in said clamping configuration, the seal portion of the first bushing-holder is pressed between the pipe, inserted and pressed in the annular housing, and said seal sector of the first tubular element.

In one aspect the first bushing-holder comprises a hooking portion configured for receiving a longitudinal end of the first bushing and stably fixing the first bushing to the first bushing-holder.

In one aspect the hooking portion extends externally, and radially away from the seal portion.

In one aspect said first bushing-holder is a single-piece element.

In one aspect said first bushing-holder is made of a single piece, i.e. said hooking portion and said seal portion are made of a single piece.

In one aspect the hooking portion and the seal portion are made of a single piece and simultaneously they are separate from each other, the hooking portion being configured for supporting said first bushing and the seal portion being configured for ensuring a fluid seal on the first tubular element.

In one aspect the hooking portion is externally spaced from, and not in contact with, said first tubular element.

In one aspect the first tubular element comprises a locking sector, configured for allowing, when the first bushing is in clamping configuration, the stable connection of the pipe inserted in the annular housing, and preventing the extraction of the pipe from the fitting.

In one aspect said seal portion of the first bushing-holder functionally corresponds to a gasket or an O-ring, and the seal fixing of a pipe to the first tubular element does not require further seal elements.

In an independent aspect thereof the present invention regards a method for manufacturing a fitting for connecting pipes, in particular flexible pipes, the method comprising the steps of:
arranging at least one first tubular element provided, at one end thereof, with a first inlet/outlet opening and defining at its interior a first duct;
arranging at least one second tubular element provided, ad one end thereof, with a second inlet/outlet opening and defining at its interior a second duct;
said first duct and second duct being connected together, at respective opposite ends, to the respective inlet/outlet opening, in a manner such that said first and second ducts are in communication with each other and overall define a joint duct of the fitting, placing said first inlet/outlet opening and said second inlet/outlet opening in fluid communication.

In one aspect the method comprises a step of arranging at least one first bushing having hollow cylindrical shape and having a longitudinal extension axis, said first bushing being associable with the first tubular element in a manner such to externally surround it and to create, between the bushing itself and the first tubular element, an annular housing intended to insertingly receive a pipe, such pipe being interposed between the first tubular element and the first bushing, said first bushing having an internal surface, intended to be directed towards the first tubular element, and an external surface, in which at least said first tubular element has an external surface intended to be directed towards said first bushing and an internal surface directed towards, and defining, said first duct, said first bushing being configured for operating at least in an insertion configuration, in which it allows the insertion of a pipe in said annular housing and a clamping configuration, in which it presses and stably locks, in a fluid-tight manner, the pipe in the annular housing.

In one aspect the method comprises a step of arranging at least one first bushing-holder configured for mounting said first bushing on said first tubular element in a manner such that the first bushing is positioned around the first tubular element, at a specific distance therefrom, and defines said annular housing, in which said first bushing-holder comprises a seal portion intended to be externally wound around and in contact with a seal sector of the first tubular element, said seal portion being configured for being interposed between a portion of the pipe, once inserted in the annular housing, and said seal sector of the first tubular element, said seal portion of the first bushing-holder attaining a fluid-tight gasket at least when said first bushing is in said clamping configuration, preventing the leakage of fluid between the first duct and the exterior of the fitting.

In one aspect the method comprises a step of externally associating the first bushing-holder with the first tubular element, with said seal portion externally wound, in contact, around the seal sector of the first tubular element.

In one aspect the method comprises a step of associating said first bushing with said first bushing-holder, in a manner such that the first bushing externally surrounds the first tubular element and creates, between the internal surface of the bushing itself and the external surface of the first tubular element, said annular housing. In one aspect, in said step of arranging at least one first bushing-holder, said first bushing-holder—comprising said seal portion—is made of a single piece, preferably by means of a molding operation.

In one aspect, in said steps of arranging at least one first bushing-holder and arranging at least one first bushing, the assembly formed by first bushing-holder and first bushing is attained by means of a co-molding operation of the first bushing-holder directly with the first bushing, in a manner such to render them integral.

In one aspect, in said co-molding operation, the bushing-holder is made of a first material, e.g. a first plastic material, and the first bushing is made of a second material, e.g. a second plastic material or a metal material In one aspect, the fitting is attained starting from a metal pipe, preferably steel, which comprises—in a single piece—said first tubular element and said second tubular element, said metal pipe being subjected to operations of forming and/or bending.

In one aspect the method also comprises the step of making at least one through opening between an external surface of the first tubular element (directed towards the exterior of the fitting) and an internal surface of the first tubular element directed towards, and defining, said first duct, in a manner such that said through opening defines a respective empty space between the external surface and the internal surface of the first tubular element.

In one aspect the method comprises a step of inserting, in the annular housing, one end of a pipe to be connected to the fitting, in a manner such that the pipe is fit on the first tubular element and partially enclosed by the first bushing.

In one aspect the method comprises the step of exerting on the external surface of the first bushing, preferably by means of a gripping profile of a clamping gripper, a clamping force capable of radially deforming, preferably plastically, said first bushing, approaching the first tubular element, in a manner such to compress the pipe between the first bushing and the first tubular element within the annular housing and stably lock, in a fluid-tight manner, the pipe in the annular housing itself.

In one aspect, during the step of exerting a clamping force on the external surface of the first bushing, said seal portion of the bushing-holder is deformed in a manner such to prevent a fluid communication between the first duct and the external surface of the first tubular element.

The method can comprise the step of arranging, on the first or second tubular element, means for connecting to a fluid source, e.g. a duct, a tap or a tank. Such connection means can comprise a threaded portion intended to be connected to a corresponding counter-threading of said fluid source in order to place the tubular element in fluid communication with the fluid source.

In one aspect thereof, the present invention regards a plant comprising at least one fitting according to one or more of the aspects and/or of the claims and at least one pipe connected to said at least one fitting.

Each of the aforesaid aspects of the invention can be taken separately or in combination with any one of the claims or of the other described aspects.

Further characteristics and advantages will be clearer from the detailed description of several embodiments, also including an exemplifying but not exclusive preferred embodiment of a fitting for connecting pipes in accordance with the present invention. Such description will be set forth hereinbelow with reference to the enclosed drawings, provided only as a non-limiting example, in which.

With reference to the abovementioned figures, reference number 1 overall indicates a fitting for connecting pipes T, in particular flexible pipes, in accordance with the present invention. In general, the same reference number is used for equivalent elements or the like, possibly in the embodiment variants thereof.

The fitting 1 is used for the mutual connection of pipes T used for transporting pressurized fluids. Such pipes T can be of the type made of a single material (e.g. rubber or plastic), or of so-called "multilayer" type (as shown in the FIGS. 9, 10, 11, 12). Multilayer pipes "T" are for example pipes containing superimposed layers of different materials and in which, specifically, one or more of such layers is made of metal material. For example, as shown in the FIGS. 9, 10, 11 and 12, the multilayer can comprise three superimposed layers T1, T2 and T3 (preferably glued together by means of intermediate adhesive layers); preferably the external T1 and internal T3 layers are made of plastic and the intermediate layer T2 is made of metal material (e.g. aluminum).

With reference to the exemplifying and non-exclusive embodiment shown in the figures, the fitting 1 comprises a first (or terminal) tubular element 3 and a second (or terminal) tubular element 4 respectively provided with a first 3a and with a second 4a inlet/outlet opening and defining at its own interior respectively a first 3b and a second 4b duct. The two tubular elements are connected to each other, at respective opposite ends, to the respective inlet/outlet opening, in a manner such that the first 3b and the second 4b ducts are in communication with each other and overall define a joint duct 2 of the fitting, which places in fluid communication the first 3a and the second 4a openings.

Preferably, the fitting 1 is also provided at least with a first bushing 11 associable, preferably in a removable manner, with the first tubular element 3 in a manner such to externally surround it and to create, between the bushing itself and the first tubular element, an annular housing 12 intended to insertingly receive the pipe T; upon completed insertion, such pipe is interposed between the first tubular element and the bushing. The bushing has an internal surface 11a, directed towards the first tubular element 3, and an external surface 11b.

Preferably, the first tubular element 3 has an external surface 6 directed towards the first bushing 11 and an internal surface 7 directed towards, and defining, the first duct 3b.

Preferably the first bushing 11 is configured for operating at least in an insertion configuration, in which it allows the insertion of a pipe T in the annular housing 12, and a clamping configuration, in which it presses and stably locks, in a fluid-tight manner, the pipe in the annular housing.

More in detail, the passage of the first bushing 11 from the insertion configuration (FIG. 9) to the clamping configuration (FIG. 11) occurs by means of a radial deformation of the bushing 11 itself, approaching the first tubular element 3, such to compress the pipe T between the bushing and the first tubular element within the annular housing 12. Such deformation is attained by acting on the external surface 11b of the bushing with a gripping profile P1 of a clamping gripper P (visible in FIG. 10), capable of plastically deforming the bushing. In other words, the passage of the bushing 11 into the clamping configuration determines a reduction of the radial extension of the annular housing 12, caused by the approaching of the bushing 11 to the first tubular element 3, and a consequent compression of the pipe T within the annular housing.

The fitting also comprises at least one first bushing-holder 30 externally associated with the first tubular element 3 and configured for mounting the first bushing 11 on the first tubular element in a manner such that the first bushing 11 is positioned around the first tubular element 3, at a specific distance therefrom, and defines the aforesaid annular housing 12.

Preferably the first bushing-holder 30 comprises a seal portion 31 externally wound around and in contact with a seal sector 40 of the first tubular element.

Preferably the seal portion 31 is configured for being interposed between a portion of the pipe T, once inserted in the annular housing 12, and the seal sector 40 of the first tubular element 3.

The seal portion 31 of the first bushing-holder 30 attains a fluid-tight gasket at least when the first bushing is in the aforesaid clamping configuration, preventing the leakage of fluid between the first duct 3b and the exterior of the fitting 1. In substance the first bushing-holder itself acts as a seal element.

It is observed that the technical solution according to the present invention first of all consists of having, structurally integrated, the part that ensures the hydraulic seal (i.e. the seal portion 31) directly in the bushing-holder 30, while typically—in the known solutions—the seal is made with one or more gaskets that are separate and moved away with respect to the bushing-holder, placed in specific positions of the fitting.

Preferably, when the first bushing 11 is in clamping configuration, the seal portion 31 of the first bushing-holder 30 is pressed between the pipe T, inserted and pressed in the annular housing 12, and the seal sector 40 of the first tubular element 3.

Preferably the first bushing-holder 30 is removably associated with the first tubular element 3.

Preferably the first bushing-holder 30 is structurally and functionally interposed between the first bushing 11 and the first tubular element 3. This allows the correct mounting of the first bushing on the first tubular element.

Preferably the first bushing-holder 30 is associated with the first tubular element 3 in a position that is radially retreated and moved away from the end of the first tubular element defining the first inlet/outlet opening 3a.

Preferably the first bushing-holder 30 comprises a hooking portion 35 configured for receiving a longitudinal end 11c of the first bushing 11 and stably fixing the first bushing to the first bushing-holder 30.

Preferably the hooking portion 35 extends externally, and radially away from the seal portion 31.

Preferably the first bushing-holder 30 is a single-piece element.

Preferably the first bushing-holder 30 is made of a single piece, i.e. the hooking portion 35 and the seal portion 31 are made of a single piece.

Preferably the hooking portion 35 and the seal portion 31 are made of a single piece and simultaneously they are portions separate from each other (from a structural and functional standpoint), the hooking portion 35 being configured for supporting the first bushing 11 and the seal portion 31 being configured for ensuring a fluid seal on the first tubular element 3.

Preferably the hooking portion 35 is externally spaced from, and not in contact with, said first tubular element 3.

Preferably the first tubular element 3 comprises a locking sector 45, configured for allowing, when the first bushing 11 is in clamping configuration, the stable connection of the pipe T inserted in the annular housing 12, and preventing the extraction of the pipe from the fitting.

Preferably the locking sector 45 can comprise means for stably anchoring the pipe once it has been inserted in the tubular housing and the first bushing has been pressed in clamping configuration. Such means can comprise ribs, annular protuberances, reliefs or grooves on the external surface side of the tubular element that forms the locking sector, which act as portions for gripping the pipe. Such means can also be of type known in the field of pressure fittings.

Preferably the seal portion 31 of the first bushing-holder 30 functionally corresponds to a gasket or an O-ring, and the seal fixing of a pipe T to the first tubular element 3 does not require further seal elements.

Preferably the seal portion 31 has an annular or toroidal or hollow cylindrical or band shape.

Preferably the locking sector 45 has a cylindrical shape and the seal sector 40 has a respective cylindrical shape.

Preferably the first tubular element 3 has a substantially hollow cylindrical shape with a first longitudinal extension axis X.

Preferably the material that composes the first tubular element has a section (or a thickness) that is substantially constant.

Preferably the locking sector 45 and the seal sector 40 are arranged in succession one after the other along a direction coinciding with the first longitudinal extension axis X.

Preferably the seal sector 40 is defined by, and occupies, a longitudinal portion of the external surface 6 of the first tubular element 3.

Preferably the locking sector 45 is defined by, and occupies, a respective longitudinal portion of the external surface 6 of the first tubular element 3.

Preferably the locking sector 45 extends starting from the first inlet/outlet opening 3*a*, and the seal sector 40 is positioned downstream of the locking sector along the first longitudinal extension axis X (with respect to the first inlet/outlet opening).

Preferably the seal sector 40 is positioned on the side of the locking sector 45 that is opposite with respect to the side where the first inlet/outlet opening 3*a* is situated. In other words, the locking sector 45 is interposed, along the longitudinal extension, between the first inlet/outlet opening 3*a* and the seal sector 40.

Preferably the locking sector 45 terminates at or leads to the first inlet/outlet opening 3*a*.

Preferably the locking sector 45 and the seal sector 40 are one after the other in the first tubular element 3, and continuously extend with respect to each other to form a single first tubular element.

Preferably the seal portion 31 of the bushing-holder 30 has an external diameter and a thickness that is preferably constant.

Preferably the locking sector 45 has a first diameter, on the external surface 6 of the first tubular element, and the seal sector 40 has a second diameter, on the external surface 6 of the first tubular element, said second diameter being smaller than the first diameter by an amount substantially equal to the thickness of the seal portion 31 of the bushing-holder 30. In such a manner, the seal portion 31, externally wound around the first tubular element 3, is substantially flush with the external surface 6 of the locking sector 45, in such case the external diameter of the seal portion substantially coinciding with the aforesaid first diameter (or slightly smaller than the first diameter).

In other words, since the seal portion 31 of the bushing-holder 30 is wound on a diameter (the aforesaid second diameter of the seal sector 40) that is lower (i.e. it is moved close to the longitudinal extension axis X) with respect to the diameter of the locking sector 45 of the tubular element, it is possible to obtain an approximately constant diameter within the annular housing 12 (i.e. the aforesaid first diameter), free to insertingly receive the pipe T.

Preferably the seal sector 40 of the first tubular element 3, having the aforesaid second diameter smaller than the first diameter, attains an annular seat 42 housing the seal portion 31 of the first bushing-holder 30.

Preferably the seal portion 31 of the first bushing-holder 30, inserted in the annular seat 42 of the seal sector 40 of the first tubular element 3, determines the mounting of the first bushing-holder 30, and of the first bushing 11 therewith, on the first tubular element 3.

In an alternative embodiment, the seal portion 31 can have an external diameter greater than said diameter, in a manner such to externally project from the external surface 6 of the locking sector 45 of the first tubular element 3. Such embodiment is capable of providing a fluid seal already following the simple insertion of the pipe T in the annular housing 12; in addition, the seal portion 31 can then be further deformed together with the pipe itself, following the crushing of the bushing, in a manner such to adhere with greater effectiveness both to the tubular element and to the pipe fit thereto, preventing leaks of fluid towards the exterior even in high operating pressure conditions.

Preferably the aforesaid diameters are referred to the first longitudinal extension axis X.

Preferably the first bushing 11 has an internal diameter, on its internal surface 11*a* and in insertion configuration, and the difference between the value of such internal diameter of the bushing and the value of the aforesaid first diameter of the locking sector 45 (i.e. of the aforesaid specific distance of the first bushing 11 from the first tubular element 3) corresponds with the radial extension of the annular housing 12 and is such at least to allow the insertion of the pipe T to be fit, for example it is substantially equal to the thickness of the pipe.

Preferably the first bushing-holder 30 and the first bushing 11, mounted thereon, are integral with each other.

Preferably the first bushing-holder 30, externally associated with the first tubular element 3 and carrying the first bushing 11 mounted thereon, can be free to rotate around the first tubular element 3, with respect to the first longitudinal extension axis X.

Preferably the bushing-holder is made of rubber or plastic material.

As an example, said rubber can be EPDM—Ethylene-Propylene Diene Monomer synthetic rubber.

Preferably the bushing-holder 30 is made of a single piece and made of a single material. Preferably the bushing-holder 30 is made by means of molding.

Preferably at least the seal portion 31 of the first bushing-holder 30, or more preferably the entire first bushing-holder 30, is made of a material adapted to sustain an elastic or plastic deformation, following the passage of the first bushing 11 from the insertion configuration to the clamping configuration, in a manner such to determine a locking, in a fluid-tight manner of the pipe, in the annular housing. Such deformation is illustrated as an example in FIG. 12.

Preferably the first bushing 11 is made of metal material, e.g. steel (for example stainless steel AISI 304).

Alternatively the first bushing 11 can be made of brass or aluminum or of a metal alloy. In a further alternative, the first bushing can be made of a deformable plastic.

Preferably the seal portion 31 and the hooking portion 35 of the first bushing-holder are joined together at an intermediate section 38, to form a single bushing-holder.

Preferably the seal portion 31 and the hooking portion 35 extend on opposite sides with respect to such intermediate section 38, and are functionally separated therefrom.

Preferably the intermediate section 38 is shared between, and connecting, the seal portion 31 and the hooking portion 35.

Preferably the first bushing-holder 30 continuously extend starting from one free end 32 of the seal portion 31, up to a respective free end 36 of the hooking portion 35. The free ends 32 and 36 of the seal portion and of the hooking portion have an annular or circular shape and are radially moved away from opposite sides of the annular housing 12. The respective ends of the seal portion and of the hooking portion, each opposite the respective free end 32 or 36, coincide in said intermediate section 38.

Preferably the section of the first bushing-holder 30, on a half-plane passing through the longitudinal extension axis X, overall has C or U shape, with the free ends of the seal portion and of the hooking portion directed towards the first inlet/outlet opening 3*a* of the first tubular element 3.

Preferably, as shown as an example in the figures, the seal portion 31 has a tubular shape.

Preferably the hooking portion 35 extends, starting from the rear end of the seal portion (opposite the free end 32), towards the exterior, moving away from the seal portion at least up to the diameter of the bushing, and partially bends towards the seal portion, externally enclosing it, maintaining the necessary distance for defining the annular housing 12. Preferably, the free end (32 or 36) is advanced towards the first inlet/outlet opening of the first tubular element, while the rear end is retreated with respect to the first inlet/outlet opening of the first tubular element.

Figure 1:
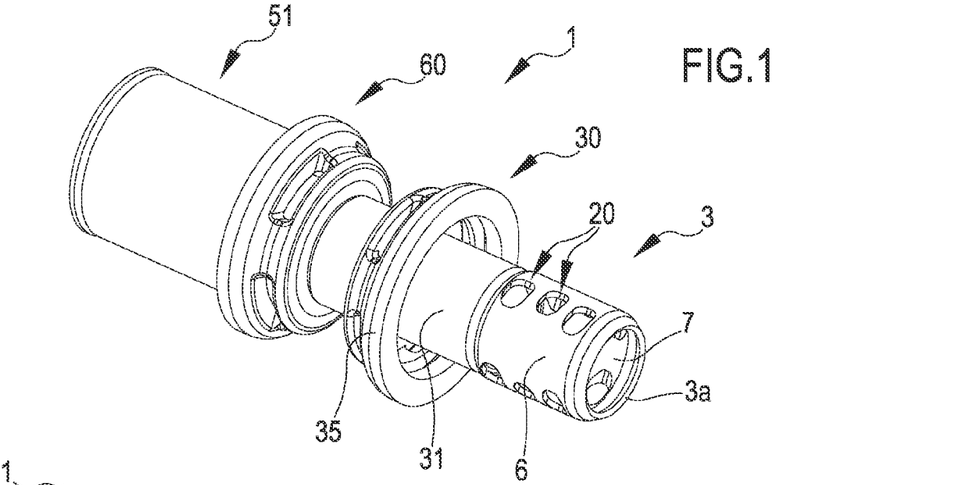
FIG. 1 shows a perspective view of a possible embodiment of a fitting for connecting pipes, in particular at least one flexible pipe, according to the present invention, with several parts removed.
Figure 2:
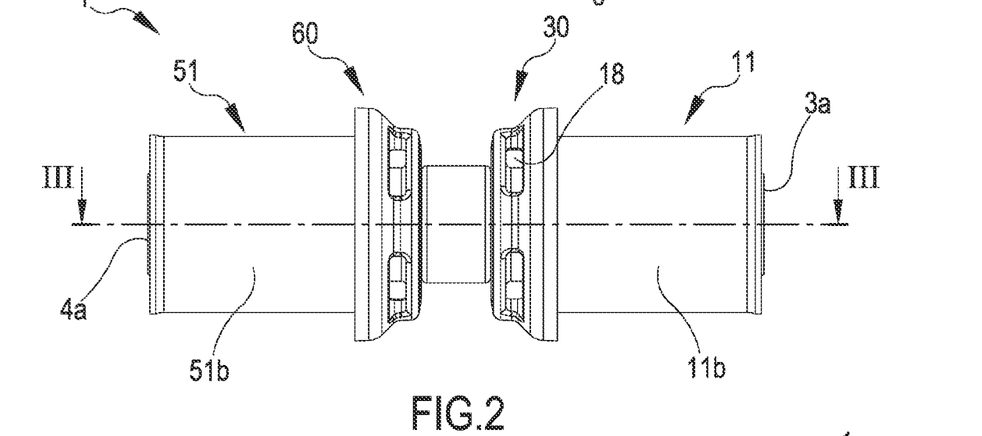
FIG. 2 shows a side view, without parts removed, of the fitting of FIG. 1.
Figure 3:
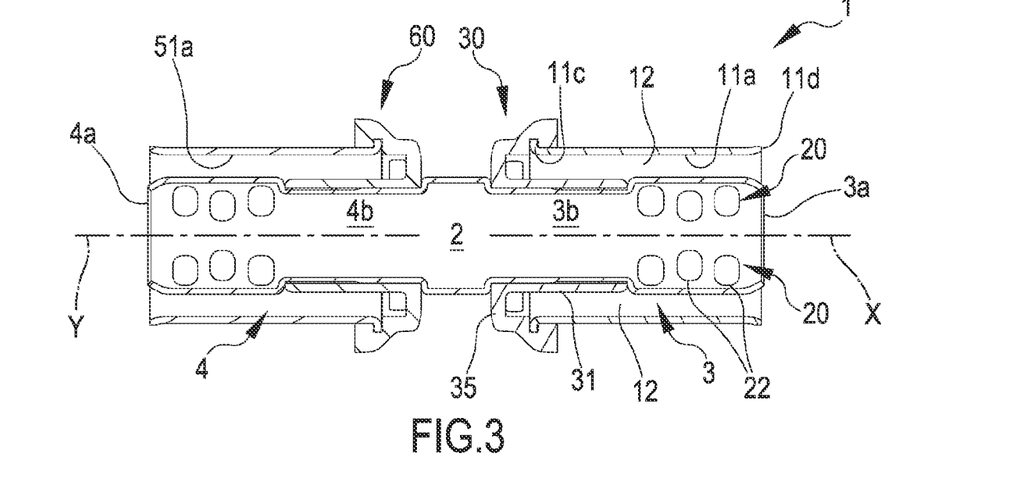
FIG. 3 shows a sectional view of the fitting of FIG. 2.
Figure 4:
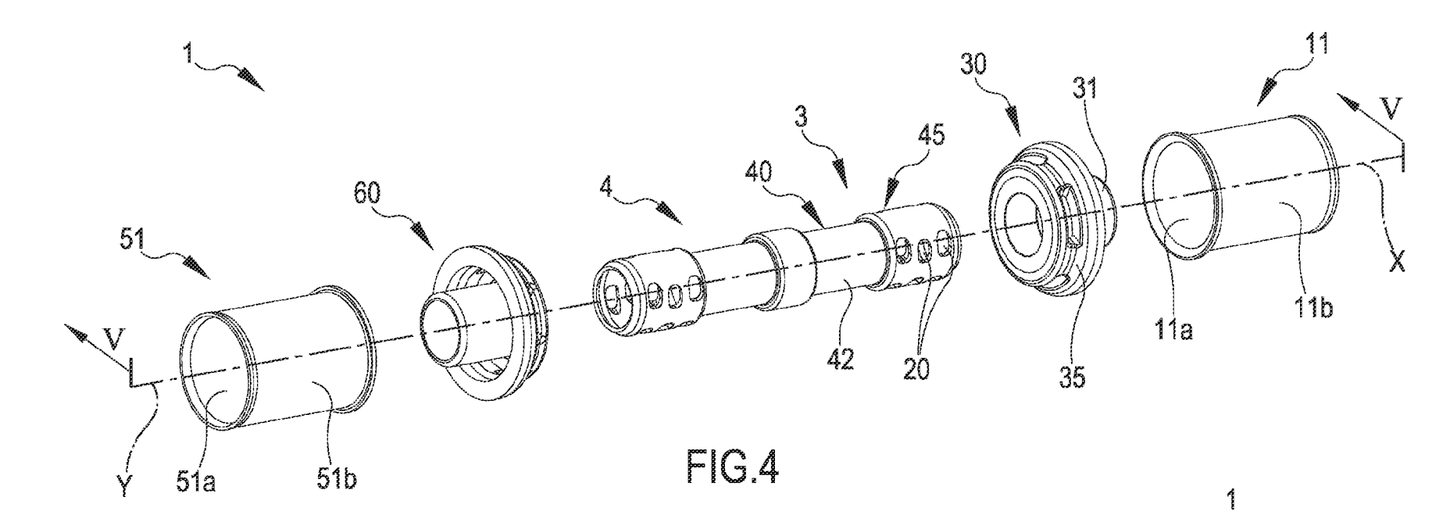
FIG. 4 shows a perspective and exploded view of the fitting of FIG. 2.
Figure 5:
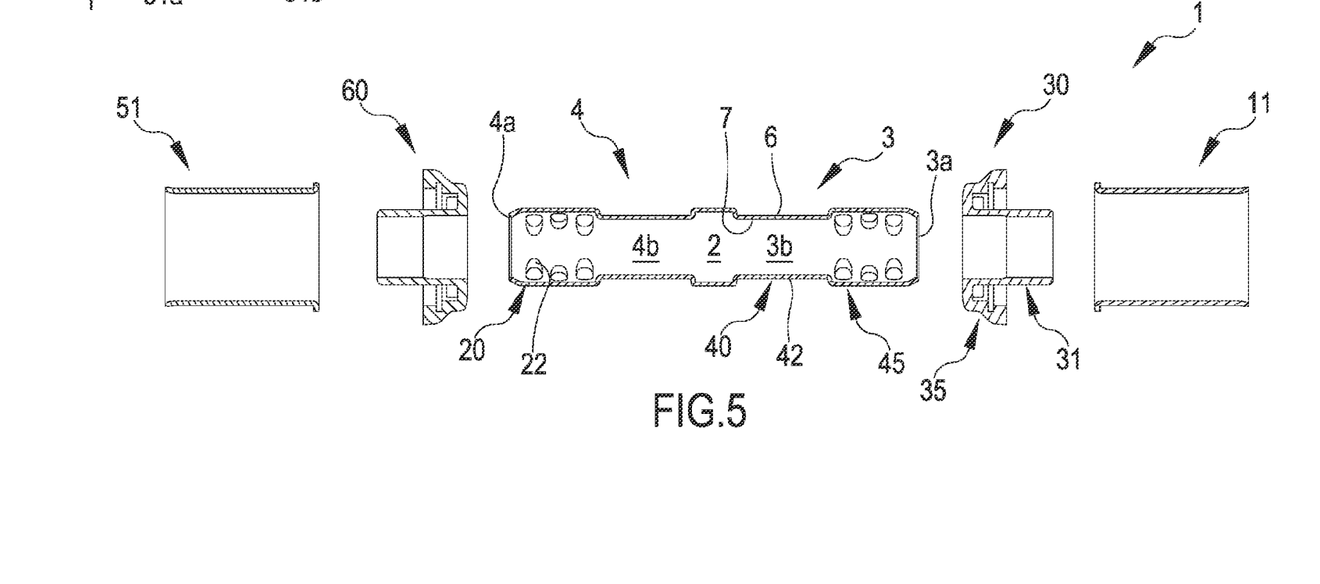
FIG. 5 shows a sectional and exploded view of the fitting of FIG. 2.

Preferably the second end 11*d* of the first bushing 11 terminates substantially axially aligned with the open end (coinciding with the first inlet/outlet opening 3*a*) of the first tubular element, said end, in the form of concentric circumferences, defining the access to the first annular housing 12 therebetween (see, for example, FIG. 3).

Preferably the seal sector 40 occupies a longitudinal portion of the first tubular element 3 having an extension equal to at least ⅒, or at least ⅕, or at least ¼, or at least ⅓, or about half of the entire longitudinal extension of the first tubular element.

Preferably the first bushing-holder 30 and the first bushing 11, mounted thereon, are integral with each other and, in fitting use conditions, form a single assembly.

Preferably the first bushing 11 extends, along the longitudinal extension axis X, between a first end 11*c*, intended to be mounted on the first bushing-holder 30, and a second end 11*d*, opposite the first end, free and defining an opening for the insertion of the piping T in the annular housing 12. The first end 11*c* of the bushing 11 is associable with the hooking portion 35 of the first bushing-holder 30. The second end 11*d* preferably comprises an entrance (e.g. a flaring towards the exterior) in order to facilitate the insertion of the end of the pipe T to be fit.

Preferably the first bushing-holder 30 is separate from the first bushing 11.

Preferably the first end 11*c* of the first bushing 11 has a mounting element (e.g. a folded lip) configured for being inserted in a mounting seat 37 (having, for example, slot form) of the hooking portion 35 of the bushing-holder 30, in order to determine the assembly of the bushing 11 with the bushing-holder.

Alternatively, the assembly formed by first bushing-holder 30 and first bushing 11 is made by means of a co-molding operation of the first bushing-holder directly with the first bushing, in a manner such to render them integral. Preferably such co-molding operation attains a fixed or removable mounting of the first bushing on the first bushing-holder (i.e. the first bushing and the first bushing-holder do not require further mounting means).

Preferably, in the aforesaid co-molding operation, the bushing-holder is made of a first material, for example a first plastic material, and the first bushing is made of a second material, e.g. a second plastic material or a metal material.

Figures 6, 7, 8:
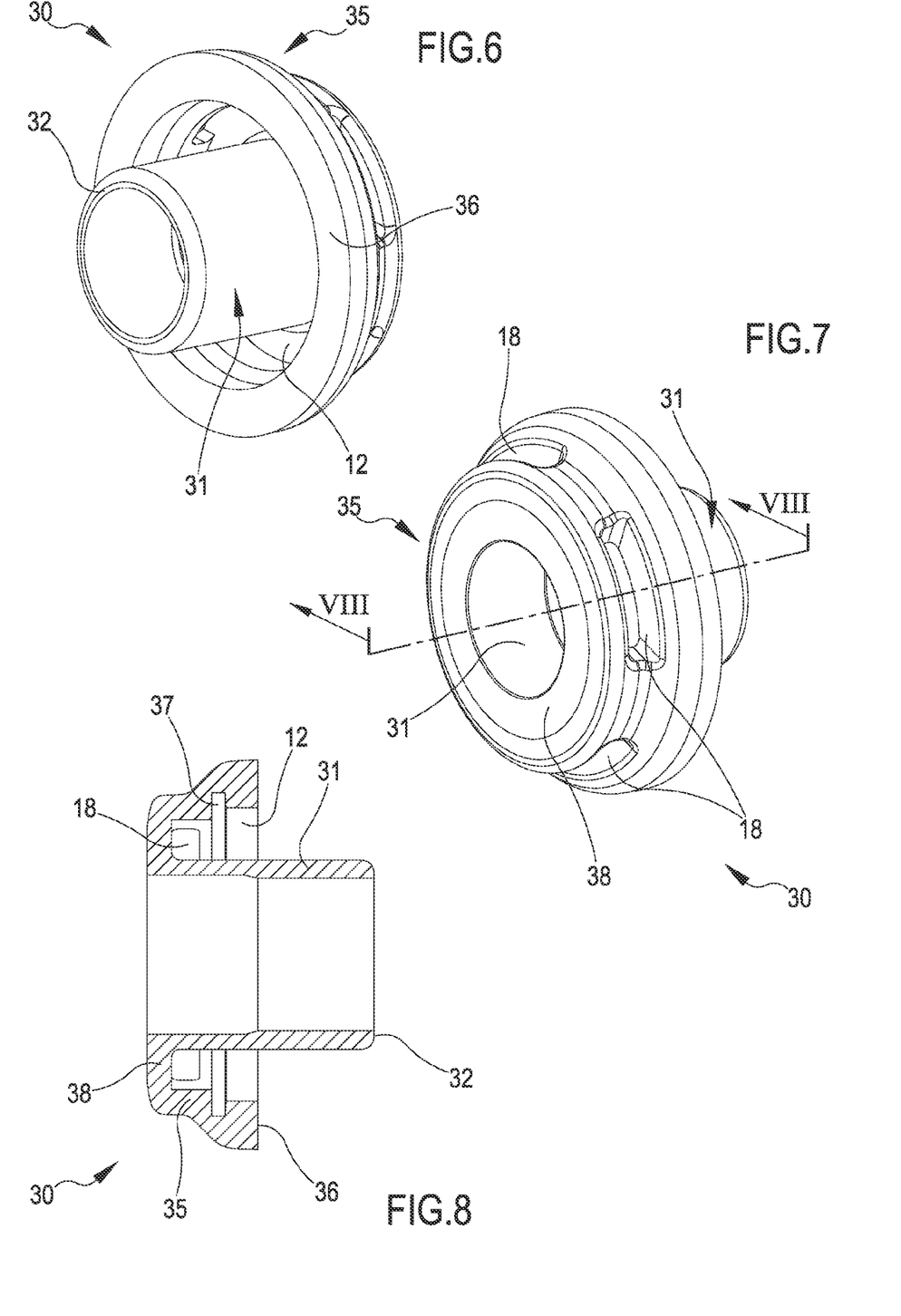
FIG. 6 shows a front perspective view of a bushing-holder of the fitting for connecting pipes of FIG. 1.
FIG. 7 shows a rear perspective view of the bushing-holder of FIG. 6.
FIG. 8 shows a sectional view of the bushing-holder of FIGS. 6 and 7.
Figure 9:
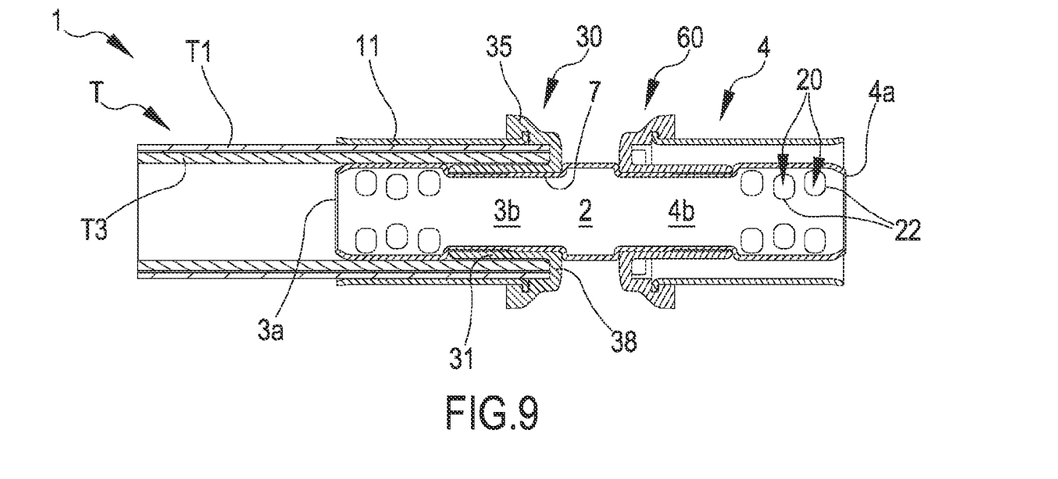
FIG. 9 shows a sectional view of the fitting of FIG. 2 in which a multilayer pipe is inserted (insertion configuration)
Figure 10:
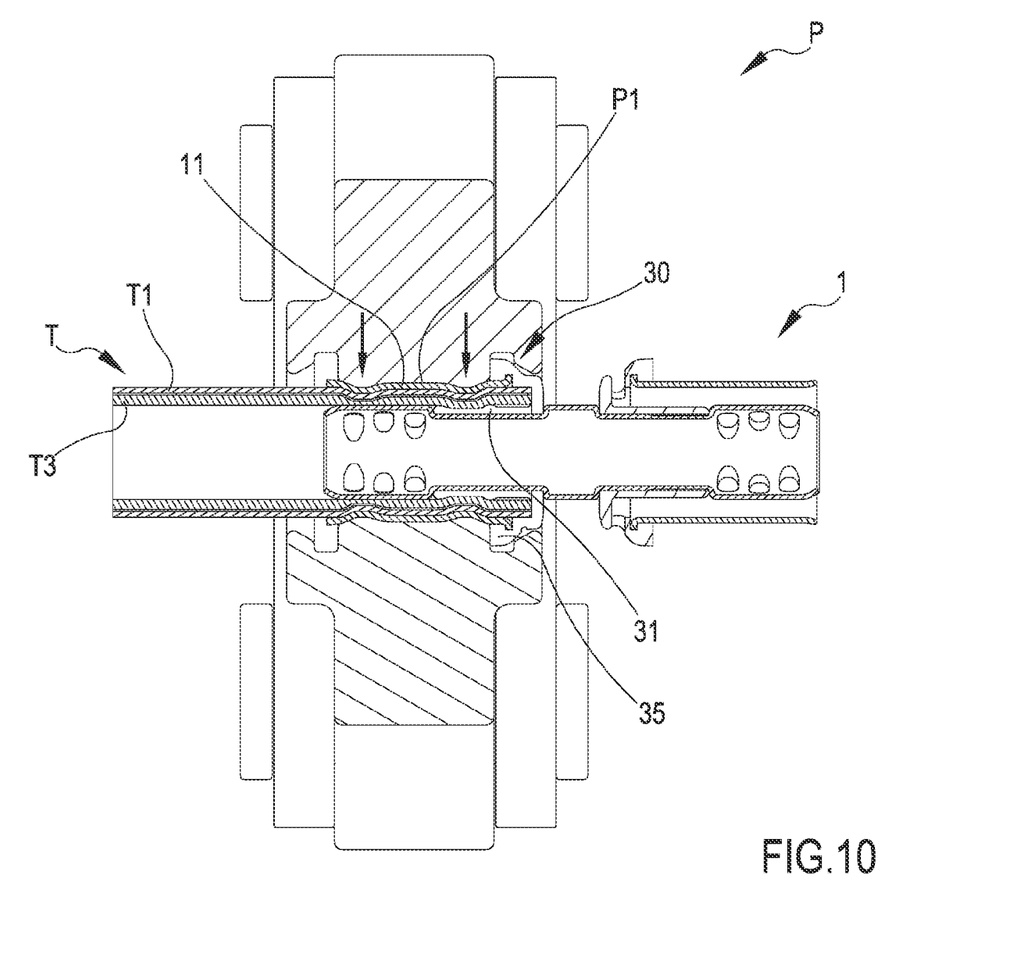
FIG. 10 shows the fitting of FIG. 9 during the operation of clamping the multilayer pipe (passage between the insertion configuration and the clamping configuration)
Figure 11:
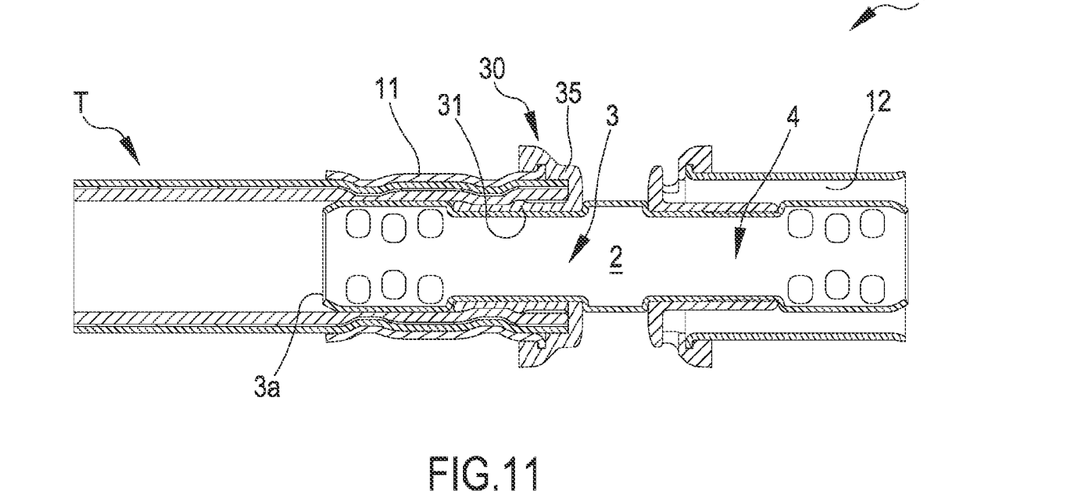
FIG. 11 shows the fitting of FIGS. 9 and 10 with the multilayer pipe mounted thereon, at the end of the clamping operations (clamping configuration)
Figure 12:
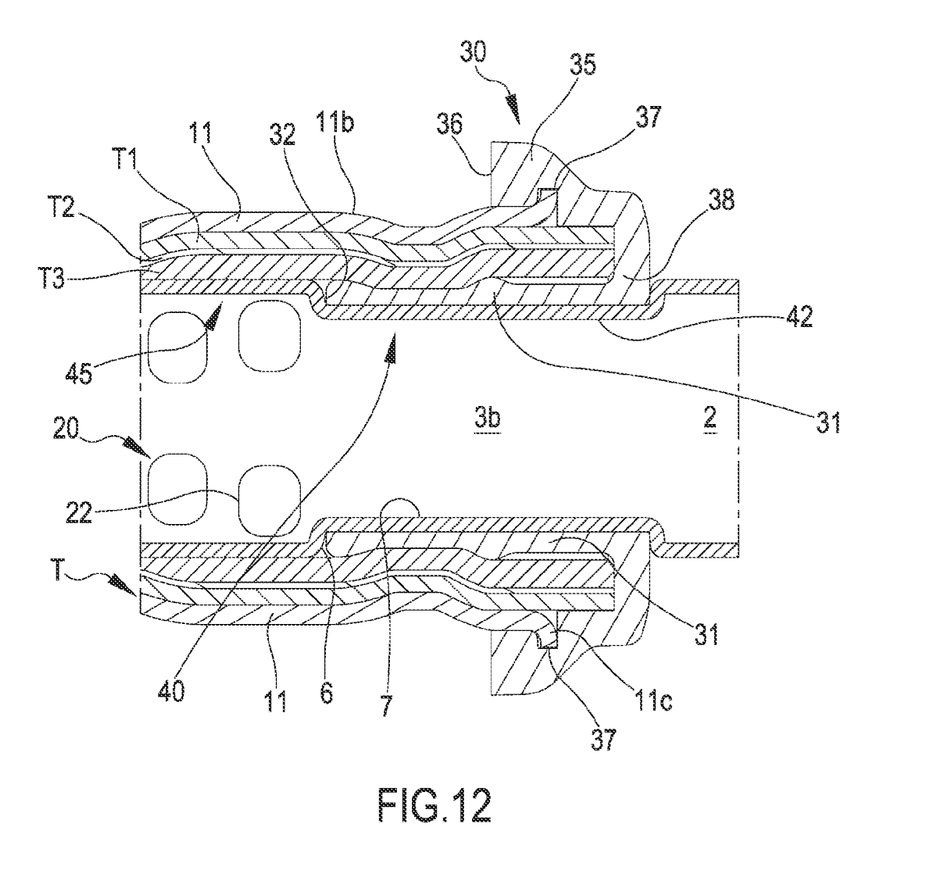
FIG. 12 shows an enlargement of a portion of the view of FIG. 11.

Preferably the bushing-holder 30 overall has an annular shape and, when associated with the first tubular element 3, it has a central axis coinciding with the longitudinal extension axis X. Preferably the bushing-holder 30 overall has a solid of revolution shape with respect to the longitudinal extension axis X (see, in particular, FIGS. 6-8).

Preferably the bushing-holder 30 comprises one or more openings 18 made in one or more circumferential positions of the bushing-holder and passing between the exterior and the interior of the bushing-holder; such openings (overall defining "windows" around the bushing-holder) are adapted to allow the observation (from outside the bushing) of the pipe T inserted in the housing 12 so as to verify the correct positioning of the pipe before proceeding with its clamping in the fitting.

As shown as an example in the figures, the fitting 1 can comprise a second bushing-holder 60, for example identical with the first bushing-holder 30, intended for the second bushing 51 and for the second tubular element 4.

Preferably, with the pipe T inserted in the annular housing 12 and with the bushing 11 in clamping configuration, the locking sector 45 attains a mechanical sealing of the pipe with the fitting, and the seal sector 40 attains a hydraulic seal.

Preferably the seal portion 31 of the first bushing-holder 30 is deformable, when the first bushing 11 is in clamping configuration, in order to prevent a fluid communication between the first duct 3*b* and an external surface of the first tubular element.

Preferably when the first bushing 11 is brought into clamping configuration, with consequent plastic deformation, the hooking portion 35 remains unchanged while the seal portion 31 undergoes a deformation, said deformation able to be of elastic type or of plastic type depending on the material composing the bushing-holder. See, for example, that shown as an example in FIG. 12.

As shown as an example in the figures, the fitting preferably comprises a second bushing 51 associated with the second tubular element 4 in a manner such to externally surround it and to create, between the bushing 51 itself and the second tubular element, a respective annular housing intended to insertingly receive a respective pipe, such pipe being interposed between the second tubular element and the second bushing. The second bushing 51 has an internal surface 51*a*, directed towards the second tubular element 4, and an external surface 51*b*, and the second tubular element 4 has a respective external surface directed towards the second bushing and a respective internal surface directed towards, and defining, the second duct 4*b*.

The second bushing 51 is configured for operating at least in an insertion configuration, in which it allows the insertion of a respective pipe in the respective annular housing, and a clamping configuration, in which it presses and stably locks, in a fluid-tight manner, the respective pipe in the annular housing.

Preferably the second bushing 51 is identical to the first bushing 11 and/or is provided with one or more of the characteristics described in the aspects and/or in the claims in relation to the first bushing 11.

Advantageously, based on the destination of the fitting, the diameter of the first tubular element and of the second tubular element can be equal to each other or different, like the diameters of the first bushing and of the second bushing. In the embodiment of the figures, the diameters of the two tubular elements are shown, as an example, equal to each other.

Preferably, as in the embodiment shown as an example in the figures, the fitting 1 has a linear (or rectilinear) shape and the first tubular element 3 has the longitudinal extension axis X coinciding with a respective longitudinal extension axis Y of the second tubular element 4.

In a possible alternative embodiment, not shown, the fitting can have a curved or angular shape, in which the respective longitudinal extension axes X and Y of the first 3 and of the second 4 tubular element form an angle different from 180° between them, e.g. 45° or 90°. In such configuration, the first and the second longitudinal extension axis are bent with respect to each other and they can intersect within the fitting, in a transition portion of the fitting between the first and the second tubular element, or outside the body of the fitting.

In a possible embodiment, the fitting can have a "T" shape and comprise three tubular elements, of which two external tubular elements are aligned with each other and a third intermediate tubular element is interposed between the two external tubular elements and is perpendicular thereto.

Preferably the first tubular element 3 and the second tubular element 4 are made of a single piece.

In a possible embodiment, shown as an example in the figures, the locking sector 45 can comprise, as means for anchoring and stably locking the pipe to the first tubular element 3, one or more through openings 20.

According to such embodiment, the first tubular element 3 can be provided with at least one through opening 20 between the external surface 6 and the internal surface 7 of the first tubular element 3. With "through opening" it is generally intended a notch or a hole, a window or a slot or a gap in the first tubular element 3: the opening can have shape and size variable depending on the embodiment, on the dimensions of the fitting and on the use destination, and passes from the exterior to the interior of the tubular element.

The through opening 20 defines a respective empty space between the external surface 6 and the internal surface 7 of the first tubular element 3. With the term empty space it is intended an absence of material in the first tubular element, i.e. an "emptying" or removal; in substance, the empty space created by the through opening defines a seat intended to be filled by material belonging to the pipe T to be connected by means of the fitting.

In the clamping configuration, the empty space defined by the through opening 20 is configured for being occupied by a portion of the pipe T pressed on the first tubular element 3 (in particular due to the pressure of the first bushing 11 on the first tubular element 3).

Preferably the aforesaid empty space is free of the material composing the first tubular element 3 at least at the section of the first tubular element. Hence the seat defined by the empty space is considered at least on the section, or thickness, of the first tubular element 3.

The fitting of the present invention—when it is provided with through openings and with empty spaces, as shown as an example in the figures—is provided with effective means for anchoring the pipe once pressed. The presence of the bushing allows optimizing the operations of coupling the pipe to the fitting, since the plastic deformation of the bushing (due to the pressing by the gripper P) determines a pressure on the pipe, with consequent compression of the pipe in the annular housing and penetration of material of the pipe into the empty spaces, and additionally such pressure remains over time, preventing the extraction of the pipe also at a distance of time.

In the embodiment shown as an example in the figures, said at least one through opening 20 is made by means of cutting and removal of the material forming the first tubular element 3.

Preferably the through opening has a specific closed polygonal shape, e.g. rectangular, circular, square, triangular.

Preferably the through opening has an edge 22 corresponding with the specific closed polygonal shape.

Preferably the empty space, defined by the through opening 20, corresponds with the section portion of the first tubular element 3 from which the material has been removed, by means of the cutting that makes the through opening.

Preferably, said at least one through opening is made by means of an operation of cutting and removal of the material forming the first tubular element. As an example, the cutting and removal of the materials occur by means of a cutting or punching operation, or laser cutting, water cutting, plasma cutting, cold cutting, flame cutting.

As an example, the plurality of through openings can comprise a set of through openings side-by-side each other in a manner such to occupy a cylindrical portion of the external surface of the first tubular element. In such set of through openings, the through openings can be offset from each other so as to make a checkboard distribution or a lattice of through openings.

In a possible embodiment, not shown, also the seal portion can be provided with one or more of said through openings, placed below the seal element.

The second tubular element 4 can also be provided with at least one respective through opening 20, between an external surface of the second tubular element directed towards the second bushing 51 and an internal surface of the second tubular element directed towards, and defining, said second duct 4b. The respective through opening 20 defines a respective empty space between the external surface and the internal surface of the second tubular element 4. In the clamping configuration, the empty space defined by the respective through opening 20 is configured for being occupied by a portion of the respective pipe pressed between the second bushing 51 and the second tubular element 4.

Preferably the second tubular element 4 is structurally identical to the first tubular element 3 and/or is provided with one or more of the characteristics described in the aspects and/or in the claims in relation to the first tubular element.

Preferably the first 3 and the second 4 tubular element attain a fitting 1 for connecting two pipes, in which the means present on the first tubular element are the same present, in an entirely mirrored manner or corresponding, on the second tubular element.

Preferably the first tubular element 3 and the second tubular element 4 are made of a single piece.

Preferably the fitting 1 is made of a single piece, except for the first bushing 11, the second bushing 51, the first bushing-holder 30 and the second bushing-holder 60.

As an alternative to the mirrored shape of the first and second tubular elements, in a possible embodiment (not shown) the second tubular element comprises means for connection to a fluid source, e.g. a duct, a tap or a tank. Preferably said connection means comprise a threaded portion intended to be connected to a corresponding counter-threading of said fluid source in order to place the fluid said second tubular element in communication with the fluid source.

Preferably, in a possible embodiment of the invention (not shown), the fitting comprises a plurality of tubular elements in fluid communication with each other, a respective pipe being fittable on each of such tubular elements, each tubular element preferably being identical to the aforesaid first or second tubular element.

Preferably the first 3 and/or the second 4 tubular element are made of metal material, preferably of steel, or brass (e.g. yellow brass CW617N), or of plastic material (e.g. PPSU technopolymer).

As an example, the first 3 and the second 4 tubular element are made by means of a steel pipe with thickness of about 1 mm, or comprised between 0.5 mm and 1.5 mm.

The fitting, object of the present invention, is in accordance with the laws for drinking water usage. As an example, the maximum operating temperature can be 150° C. in continuous operation and the maximum operating pressure 10 bar.

The bushings 11 and 51 in accordance with the present invention are configured in order to be clamped by means of grippers having a gripping profile of type B or of type F or of type H or of type TH or of type U or another profile, with reference to the gripping standards for fittings known in the hydraulic sector. In substance the bushing is shaped in a manner such that with each of such grippers, the deformation is of the right size, i.e. neither insufficient (if seal problems are verified) nor excessive (if the pipe is damaged).

The invention thus conceived is susceptible of numerous modifications and variations, all falling within the scope of the inventive concept, and the abovementioned components can be substituted by other technically equivalent elements.

The invention achieves important advantages. First of all, as clearly emerges from the above-described description, the invention allows overcoming at least some of the drawbacks of the prior art.

In more detail, the above-described fitting, characterized by a bushing-holder which integrates a seal portion therein which attains a fluid-tight gasket, allows simplifying the attainment and assembly of the fitting itself.

This translates into a lower manufacturing cost of the fitting, into a reduced assembly time for the fitting and into a simplification of the installation operations. In addition, the seal portion directly made in the bushing-holder allows obtaining a more effective and safer fluid seal, hence increasing the reliability of the fitting when in use.

Additionally, the bushing-holder provided with seal portion allows preventing possible problems, which can occur in the known figures, due to an incorrect or unstable positioning of the gasket, which can cause fluid leaks.

The fitting according to the present invention is characterized by high and constant performances, even after long installation times and in case of high operating pressures.

The fitting according to the present invention is provided with innovative means, in particular the bushing-holder integrating the seal element, in a single piece, capable of ensuring an effective hydraulic seal once the flexible pipe is inserted and pressed in the fitting.

The fitting according to the present invention is characterized by a reduced cost, in particular if compared with the cost of the known solutions, while ensuring the necessary performances and the correct connection of pipes to the fitting.

Overall the fitting of the present invention is characterized by a high reliability of operation and by a lower tendency to fail or malfunction.

The fitting, object of the present invention, is advantageously employable with a plurality of clamping grippers.

Finally, the fitting according to the present invention is characterized by a simple and rational structure.

The invention claimed is:

1. Fitting (1) for connecting pipes (T), comprising:
   at least a first tubular element (3) provided, at one end thereof, with a first inlet/outlet opening (3a) and defining at its interior a first duct (3b);
   at least a second tubular element (4) provided, at one end thereof, with a second inlet/outlet opening (4a) and defining at its interior a second duct (4b),
   said first (3) and second (4) tubular elements being connected to each other at respective opposite ends to the respective inlet/outlet opening, in a manner such that said first (3b) and second (4b) ducts are in communication with each other and overall define a joint duct (2) of the fitting, placing said first inlet/outlet (3a) and said second inlet/outlet opening (4a) in fluid communication,
   the fitting comprising at least a first bushing (11) associable with the first tubular element (3) in a manner such to externally surround it and to create, between the bushing itself and the first tubular element, an annular housing (12) intended to insertingly receive a pipe (T), such pipe being interposed between the first tubular element and the first bushing, said first bushing having an internal surface (11a), directed towards the first tubular element (3), and an external surface (11b); wherein at least said first tubular element (3) has an external surface (6) directed towards said first bushing (11) and an internal surface (7) directed towards, and defining, said first duct (3b),
   said first bushing (11) being configured for operating at least in an insertion configuration, in which it allows the insertion of a pipe (T) in said annular housing (12), and a clamping configuration, in which it presses and stably locks, in a fluid-tight manner, the pipe in the annular housing,
   wherein the fitting also comprises at least a first bushing-holder (30) externally associated with the first tubular element (3) and configured for mounting said first bushing (11) on said first tubular element in a manner such that the first bushing (11) is positioned around the first tubular element (3), at a specific distance therefrom, and defines said annular housing (12),
   wherein said first bushing-holder (30) comprises a seal portion (31) externally wound around and in contact with a seal sector (40) of the first tubular element,
   said seal portion (31) being configured for being interposed between one portion of the pipe (T), once inserted in the annular housing (12), and said seal sector (40) of the first tubular element (3),
   said seal portion (31) of the first bushing-holder (30) forming a fluid-tight gasket at least when said first bushing is in said clamping configuration, preventing the leakage of fluid between the first duct (3b) and the exterior of the fitting (1).
   wherein the first bushing-holder (30) comprises a hooking portion (35) configured for receiving a longitudinal end of the first bushing (11) and stably fixing the first bushing to the first bushing-holder (30);
   wherein the first bushing (11) extends, along the longitudinal extension axis (X), between a first end (11c), intended to be mounted on the hooking portion (35) of the first bushing-holder (30), and a second end (11d), opposite the first end, free and defining an opening for the insertion of the piping (T) in the annular housing (12),
   and wherein the first end (11c) of the first bushing (11) has a mounting element configured for being inserted in a mounting seat (37) of the hooking portion (35) of the first bushing-holder (30), in order to determine the assembly of the bushing with the bushing-holder.

2. The fitting (1) according to claim 1, wherein the hooking portion (35) extends externally, and radially away from the seal portion (31), or wherein said first bushing-holder (30) is a single-piece element, or wherein said first bushing-holder (30) is made of a single piece, i.e. said seal portion (31) and said hooking portion (35) are made of a single piece.

3. The fitting (1) according to claim 1, wherein, when the first bushing (11) is in said clamping configuration, the seal portion (31) of the first bushing-holder (30) is pressed between the pipe (T), inserted and pressed in the annular housing (12), and said seal sector (40) of the first tubular element (3), and wherein the first bushing-holder (30) is structurally and functionally interposed between the first bushing (11) and the first tubular element (3), and/or wherein the first bushing-holder (30) is removably associated with the first tubular element (3).

4. The fitting (1) according to claim 1, wherein said first bushing-holder (30) is associated with the first tubular element (3) in a position that is radially retreated and moved away from the end of the first tubular element defining said first inlet/outlet opening (3a),
and/or wherein the first tubular element (3) comprises a locking sector (45), configured for allowing, when the first bushing (11) is in clamping configuration, the stable connection of the pipe (T) inserted in the annular housing (12), and preventing the extraction of the pipe from the fitting,
and/or wherein said seal portion (31) of the first bushing-holder (30) functionally corresponds to a gasket or an O-ring, and the seal fixing of a pipe (T) to the first tubular element (3) does not require further seal elements, and/or wherein the seal portion (31) has an annular or toroidal or hollow cylindrical or band shape.

5. The fitting (1) according to claim 4, wherein the first tubular element (3) has a substantially hollow cylindrical shape with a first longitudinal extension axis (X), and wherein the locking sector (45) and the seal sector (40) are arranged in succession one after the other along a direction coinciding with the first longitudinal extension axis (X), or wherein the seal sector (40) is defined by, and occupies, a longitudinal portion of the external surface (6) of the first tubular element (3), and the locking sector (45) is defined by, and occupies, a respective longitudinal portion of the external surface (6) of the first tubular element (3).

6. The fitting (1) according to claim 4, wherein the locking sector (45) extends starting from the first inlet/outlet opening (3a), and the seal sector (40) is positioned downstream of the locking sector along the first longitudinal extension axis (X), and wherein the locking sector (45) terminates at or leads to the first inlet/outlet opening (3a), or wherein the locking sector (45) and the seal sector (40) are one after the other in the first tubular element (3), and continuously extend with respect to each other to form a single first tubular element (3).

7. The fitting (1) according to claim 4, wherein the seal portion (31) of the first bushing-holder (30) has an external diameter and a constant thickness, and wherein the locking sector (45) has a first diameter, on the external surface (6) of the first tubular element (3), and the seal sector (40) has a second diameter, on the external surface of the first tubular element, said second diameter being smaller than the first diameter by an amount substantially equal to said thickness of the seal portion (31) of the first bushing-holder (30), in a manner such that the seal portion (31), externally wound around the first tubular element (3), is substantially flush with the external surface of the locking sector, in such case the external diameter of the seal portion (31) being substantially coinciding with said first diameter, and/or wherein the seal sector (40) of the first tubular element (3), having said second diameter smaller than said first diameter, forms an annular seat (42) housing said seal portion (31) of the first bushing-holder (30), and/or wherein the seal portion (31) of the first bushing-holder (30), inserted in the annular seat (42) of the seal sector of the first tubular element, determines the mounting of the first bushing-holder (30), and of the first bushing (11) therewith, on the first tubular element (3).

8. The fitting (1) according to claim 4, wherein said first bushing (11) has an internal diameter, on its internal surface (11a) and in insertion configuration, and the difference between the value of such internal diameter of the bushing and the value of said first diameter of the locking sector (45) corresponds with the radial extension of the annular housing (12) and is such to at least allow the insertion of the pipe (T) to be fit, and/or wherein the first bushing-holder (30) and the first bushing (11), mounted thereon, are integral with each other and are, in fitting use conditions, a single assembly.

9. The fitting (1) according to claim 1, wherein the first bushing-holder (30) is made of rubber or of plastic material, and/or wherein the first bushing-holder (30) is made of a single piece and made of a single material, and/or wherein the first bushing-holder (30) is made by means of molding, and/or wherein at least said seal portion (31) of the first bushing-holder (30) is made of a material adapted to sustain an elastic or plastic deformation, following the passage of the first bushing (11) from the insertion configuration to the clamping configuration, in a manner such to determine a fluid-tight locking of the pipe (T) in the annular housing (12).

10. The fitting (1) according to claim 1, wherein the seal portion (31) and the hooking portion (35) of the first bushing-holder (30) are joined together at an intermediate section (38), to form a single bushing-holder (30), and/or wherein the seal portion (31) and the hooking portion (35) extend on opposite sides with respect to said intermediate section (38), and are functionally separated therefrom, and/or wherein the intermediate section (38) is shared between, and connecting, the seal portion and the hooking portion, and/or wherein the first bushing-holder (30) continuously extends starting from a free end (32) of the seal portion, up to a free end (36) of the hooking portion (35).

11. The fitting (1) according to claim 1, wherein the section of the first bushing-holder (30), on a half-plane passing through the longitudinal extension axis, overall has a C or U shape, with the free ends (32, 36) of the seal portion (31) and of the hooking portion (35) directed towards the first inlet/outlet opening (3a) of the first tubular element (3), and/or wherein the seal portion (31) has a tubular shape, and/or wherein the seal sector (40) occupies a longitudinal portion of the first tubular element (3) having an extension equal to at least $1/10$, or at least $1/5$, or at least $1/3$, or about half of the entire longitudinal extension of the first tubular element.

12. The fitting (1) according to claim 1, wherein the assembly constituted by the first bushing-holder (30) and the first bushing (11) is formed by means of an operation of co-molding the first bushing-holder directly with the first bushing, in a manner such to render them integral, and/or wherein, in said co-molding operation, the first bushing-holder (30) is made of a first material, e.g. a first plastic material, and the first bushing (11) is made of second material, e.g. a second plastic material or a metal material.

13. The fitting (1) according to claim 1, wherein the passage of the first bushing (11) from said insertion configuration to said clamping configuration occurs by means of a radial deformation of said first bushing (11), approaching the first tubular element (3), such to compress the pipe (T) between the first bushing (11) and the first tubular element (3) within the annular housing (12), said deformation being attained by acting on the external surface (11b) of the first bushing with a gripping profile (P1) of a clamping gripper (P), capable of plastically deforming said first bushing, and/or wherein the passage of the first bushing into said clamping configuration causes a reduction of the radial extension of the annular housing (12), caused by the approaching of the first bushing (11) to the first tubular element (3), and a consequent compression of the pipe (T) within the annular housing, and/or wherein said seal portion (31) of the first bushing-holder (30) is deformable, when said first bushing (11) is in clamping configuration, in order to prevent a fluid communication between the first duct (3b) and an external surface of the first tubular element (3), and/or wherein, when said first bushing (11) is brought into clamping configuration, with consequent plastic deformation, the hooking portion (35) remains unchanged while the seal portion (31) undergoes a deformation, said deformation being able to be of elastic type or plastic type depending on the material constituting the bushing-holder (30).

14. Method for manufacturing a fitting (1) for connecting pipes, the method comprising the steps of:
    arranging at least a first tubular element (3) provided, at one end thereof, with a first inlet/outlet opening (3a) and defining at its interior a first duct (3b);
    arranging at least a second tubular element (4) provided, at one end thereof, with a second inlet/outlet opening (4a) and defining at its interior a second duct (4b);
    said first duct (3b) and second duct (4b) being connected together, at respective opposite ends, to the respective inlet/outlet opening, in a manner such that said first and second ducts are in communication with each other and overall define a joint duct (2) of the fitting (1), placing said first inlet/outlet opening (3a) and said second inlet/outlet opening (4a) in fluid communication;
    arranging at least a first bushing (11) having hollow cylindrical shape and having a longitudinal extension axis, said first bushing (11) being associable with the first tubular element (3) in a manner such to externally surround it and to create, between the bushing itself and the first tubular element, an annular housing (12) intended to insertingly receive a pipe (T), such pipe being interposed between the first tubular element and the first bushing, said first bushing having an internal surface (11a), intended to be directed towards the first tubular element (3), and an external surface (11b), wherein at least said first tubular element (3) has an external surface (6) intended to be directed towards said first bushing (11) and an internal surface (7) directed towards, and defining, said first duct (3b), said first bushing (11) being configured for operating at least in an insertion configuration, in which it allows the insertion of a pipe (T) in said annular housing (12), and a clamping configuration, in which it presses and stably locks, in a fluid-tight manner, the pipe in the annular housing;
    arranging at least a first bushing-holder (30) configured for mounting said first bushing (11) on said first tubular element (3) in a manner such that the first bushing (11) is positioned around the first tubular element (3), at a specific distance therefrom, and defines said annular housing (12),
    wherein said first bushing-holder (30) comprises a seal portion (31) intended to be externally wound around and in contact with a seal sector (40) of the first tubular element (3),
    said seal portion (31) being configured for being interposed between a portion of the pipe (T), once inserted in the annular housing (12), and said seal sector (40) of the first tubular element (3),
    said seal portion (31) of the first bushing-holder (30) forming a fluid-tight gasket at least when said first bushing (11) is in said clamping configuration, preventing the leakage of fluid between the first duct (3b) and the exterior of the fitting (1);
    externally associating the first bushing-holder (30) with the first tubular element (3), with said seal portion (31) externally wound around and in contact with the seal sector (40) of the first tubular element;
    associating said first bushing (11) with said first bushing-holder, in a manner such that the first bushing (11) externally surrounds the first tubular element (3) and creates, between the internal surface (11a) of the bushing itself and the external surface (6) of the first tubular element, said annular housing (12);
    wherein, in said step of arranging at least a first bushing-holder (30), the first bushing-holder (30) comprises a hooking portion (35) configured for receiving a longitudinal end of the first bushing (11) and stably fixing the first bushing to the first bushing-holder (30);
    and wherein, in the step of arranging at least a first bushing (11), the first bushing (11) extends along the longitudinal extension axis (X) between a first end (11c), intended to be mounted on the hooking portion (35) of the first bushing-holder (30), and a second end (11d), opposite the first end, free and defining an opening for the insertion of the piping (T) in the annular housing (12), the first end (11c) of the first bushing (11) having a mounting element configured for being inserted in a mounting seat (37) of the booking portion (35) of the first bushing-holder (30), in order to determine the assembly of the bushing with the bushing-holder.

15. The method according to claim 14, wherein, in said step of arranging at least a first bushing-holder (30), said first bushing-holder—comprising said seal portion (31)—is made of a single piece, and/or wherein the first bushing-holder (30) is made of rubber or of plastic material, and/or wherein at least said seal portion (31) of the first bushing-holder (30) is made of a material adapted to sustain an elastic or plastic deformation following the passage of the first bushing (11) from the insertion configuration to the clamping configuration, in a manner such to determine a fluid-tight locking of the pipe (T) in the annular housing (12).

* * * * *